Jan. 4, 1938. J. GALAMB 2,104,457
AUTOMOBILE BODY CONSTRUCTION
Filed April 29, 1937
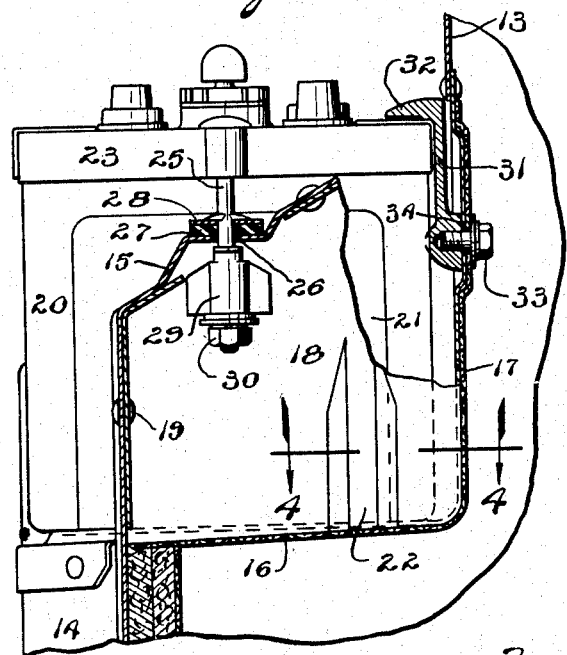
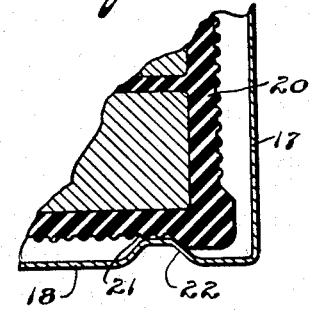
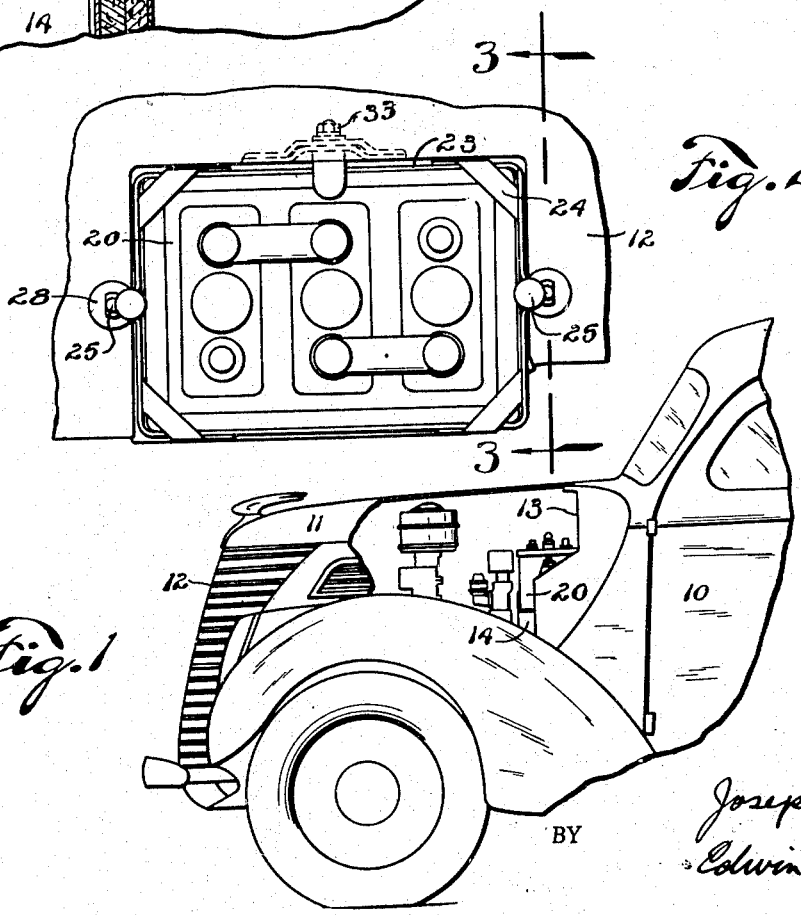
INVENTOR.
Joseph Galamb
BY Edwin C. McRae
ATTORNEY Patented Jan. 4, 1938

2,104,457

UNITED STATES PATENT OFFICE 2,104,457

AUTOMOBILE BODY CONSTRUCTION

Joseph Galamb, Detroit, Mich., assignor to Ford Motor Company, Dearborn, Mich., a corporation of Delaware Application April 29, 1937, Serial No. 139,744

11 Claims. (Cl. 180—68.5)

The object of my invention is to provide an automobile body construction which is adapted to support the battery of the vehicle in position on the vehicle dash. Heretofore, vehicle batteries have generally been placed in the frame underneath the body of the car and are therefore accessible only from the inside of the vehicle body. For this reason locking the doors of the car effectively prevents persons from stealing the battery.

This conventional location is becoming less desirable because the floor boards of the modern automobile have been lowered, till now there is not room to place the battery therebeneath. The bottom of the battery when so placed in the modern car is too close to the ground. The logical place for such battery is on a shelf formed in the forward front face of the vehicle dash within the engine compartment. This location, however, permits access to the battery from the engine compartment and in many cases where the battery has been so located, trouble has been experienced from the batteries being stolen. It is the purpose of this invention to provide locking means associated with the forward face of the vehicle dash for retaining a vehicle battery thereon, which means may be operated only from within the passengers' compartment to effect removal of the battery therefrom.

More specifically my invention comprises a means associated with the front face of the dash which coacts with the ends of the battery and prevents its withdrawal in a forward horizontal direction, and means which coacts with the top of the battery which prevents its removal vertically. These two locking means are supplemented by a conventional hold-down cover, which serves to fasten the battery in position against vibration, etc.

With these and other objects in view, my invention consists in the arrangements, construction and combination of the various parts of my improved device, as described in this specification, claimed as my claims and illustrated in the accompanying drawing, in which:

Figure 1 is a side elevation of the front part of a motor vehicle, a portion of the engine hood being broken away to better illustrate the position of the battery in place.

Figure 2 is a top view of my improved battery hold-down mechanism.

Figure 3 is a sectional view, taken on the line 3—3 of Figure 2, and

Figure 4 is a sectional view taken on the line 4—4 of Figure 3.

In referring to the accompanying drawing, I have used the reference numeral 10 to indicate the body of a motor vehicle, which body is provided with a hood 11, and radiator shell 12, all arranged in the conventional manner. A dash 13 extends from the rear portion of the hood downwardly to the floor of the car and separates the engine compartment from the passenger or body compartment. The engine compartment is closed by the hood 11. The upper portion of the dash 13 is disposed rearwardly from the lower portion thereof, which lower portion is given the reference numeral 14, and a diagonally extending portion 15 connects the lower edge of the dash 13 with the upper edge of the part 14. It will be understood that these three members are manufactured as a single sheet metal stamping, and that the purpose of rearwardly offsetting the upper portion of the dash is to allow a longer hood to be used for the sake of appearance without sacrificing foot room in the car.

I have provided a shelf on the dash which is located on one side of the vehicle motor, and upon which shelf a vehicle battery 20 is disposed. This shelf comprises a rectangular shaped box member having a bottom 16, a rear wall 17, and end walls 18. This box member is let down into a rectangular shaped opening in the diagonal member 15 and is securely fastened in place by means of rivets 19. It will be seen that the portions 16, 17 and 18 of the box form a continuation of the dash proper, so as to complete the partition between the driving compartment and the motor compartment. It should be further noted that these same walls form a rectangular shaped container which has the top and forward sides exposed to the engine compartment.

The vehicle battery 20 rests upon the bottom plate 16. The battery is provided with a conventional molded rubber battery case. A vertically extending recessed panel 21 is molded into each end of the battery case, which panel functions as a vertical groove. The panel will hereafter be referred to as groove 21. A tongue 22 is pressed inwardly from each end wall 18, these tongues extending upwardly several inches from the bottom 16. The tongues project inwardly into the grooves 21 at the ends of the battery.

In order that the battery may be installed upon the shelf 16, it is necessary that the battery be pushed rearwardly against the rear wall 13 and then lowered so that the tongues 22 slide upwardly in the grooves 21. When the battery is resting upon the shelf 16 the tongues 22 effectively prevent forward movement of the battery. In order that the battery may be removed, it is necessary to lift the same bodily beyond the upper edges of the tongues 22, when it is then free to move forwardly, if desired.

I have provided a frame member for holding the battery down upon the shelf, which frame comprises a rectangular shaped strip 23 which extends around the upper portion of the battery. The corners of the strip have gussets 24 extending thereacross, so that when the strip is dropped down over the battery, these gussets 24 prevent the strip from being lowered further. A bolt 25 is secured to each end of the strip 23 which bolts extend downwardly through openings 26 in the diagonal part 15. A felt washer 27 is inserted around each bolt 25 just above the opening 26, which washers are squeezed between a second pair of washers 28 to thereby form a seal around the openings 26. A bracket 29 is secured to each end wall 18 beneath the diagonal portion 15 and within the body compartment, each bracket 29 having an opening therein through which the lower end of the adjacent bolt 25 projects. A nut 30 is threaded on the lower end of each bolt 25 so that the frame 23 may be drawn down at each end by tightening the nuts 30. It will be noted that access to the nuts 30 can only be had from inside of the car, so that when the car body portion is locked, the battery is adequately protected from being stolen.

However, the applicant has found that in a few instances persons will cut the bolts 25 between the bottom of the frame 23 and the washer 28 which would allow the frame to be removed and, consequently, allow the battery to be taken. In order to prevent this, an auxiliary means is provided for preventing the removal of the battery. The auxiliary means comprises an arm 31 having a forwardly turned head 32 formed thereon. A stud 33 is threaded into lowermost end of the arm 31. The stud 33 is adapted to enter an opening 34, which is punched in the rear wall 17 of the battery compartment. The arm 31 is spot welded to the frame 23.

In assembling the device, the battery with the frame 23 attached is moved rearwardly to position above the tongues 22. The battery is now lowered so that the tongues 22 enter the grooves 21. The bolts 25 enter the openings 26 and extend through the bolt receiving openings in the brackets 29. The nuts 30 are then threaded in place. The stud 33 is then threaded into the lower end of the arm 31 from inside of the car body.

From the foregoing it will be seen that the battery is prevented from jiggling on the shelf 16 by frame 23. However, if the studs 25 are cut, then the head 32 will effectively prevent the battery from being raised and, as the same cannot be withdrawn horizontally until it has been raised above the tongues 22, the theft of the battery is, thereby, prevented. It will be noted that the head 32 is positioned against the rear wall 17 at the intersection thereof with the part 15 and that in such position is so inaccessible that the head cannot be sawed from the arm 31. When it is forcibly attempted to pry the battery loose from the box the hard rubber case is invariably cracked or broken to practically destroy the battery. This discourages attempted theft, as the battery is of practically no value after it has been thus removed.

Among the many advantages arising from the use of this construction, it may be well to mention the battery being placed in an accessible position near the motor, permits shorter lead wires from the battery to the starting motor which effects considerable saving in the copper required for the relatively heavy conductors which operate the vehicle starting motor. A further advantage is that the battery is in convenient position for servicing, that is, adding water and testing. Still a further advantage results in that the battery is protected from stones thrown up from the road. The location of the battery on the dash of the car further allows the floor boards of the vehicle to be lowered, as the minimum ground clearance permissible between bottom of the battery and the ground heretofore required a higher floor than would otherwise be necessary.

These advantages are obtained without sacrificing security, as it is impossible to remove the battery from my dash support without access being had to the inside of the car. The car may, of course, be locked to provide the same degree of security as formerly provided.

Some changes may be made in the arrangement, construction and combination of the various parts of my improved device without departing from the spirit of my invention, and it is my intention to cover by my claims such changes as may reasonably be inserted in the scope thereof.

I claim as my invention:

1. A device of the character described comprising, a vehicle dash, a horizontal shelf formed on the forward face of said dash, a vehicle battery supported on said shelf, detachable means coacting with said battery and vehicle dash which in its engaged position retains said battery upon said shelf, and locking means accessible only from the rear face of said dash for locking said detachable means in said engaged position.

2. A device of the character described comprising, a vehicle dash, a shelf formed on the forward face of said dash, a vehicle battery supported upon said shelf, a frame positioned over the top of said battery, said frame having bolts extending therefrom through suitable openings in said dash, and nuts threaded upon said bolts and accessible only from the rear face of said dash for locking said battery upon said shelf.

3. A device of the character described comprising, a vehicle dash having its intermediate vertical portion offset rearwardly, a forwardly opening three-sided battery retainer fixedly secured in a rectangular shaped opening in said offset portion of the dash, a frame extending around the top portion of said battery, bolts extending downwardly through said frame and through suitable openings in said offset portion of the dash, and nuts threaded upon the bottom ends of said bolts in position accessible only from the rear of said dash, to draw said frame and battery downwardly into said battery retainer.

4. A device of the character described comprising, a vehicle dash, a shelf mounted on the forward face of said dash, a battery mounted upon said shelf, means associated with said shelf which coact with said battery and permit same to be removed from said shelf through a movement in one direction only, holding means associated with said dash which in its engaged position coacts with said battery to prevent movement thereof in said direction, and locking means accessible only from the rear face of said dash for locking said holding means in its engaged position.

5. A device of the character described comprising, a vehicle dash, a shelf formed on the forward face of said dash, a battery mounted upon said shelf, means associated with said shelf which coacts with said battery and permits only the lowering and raising of the battery from said shelf, holding means associated with said dash which in its engaged position coacts with said battery to prevent raising of the battery from said shelf, and locking means accessible only from the rear face of said dash for locking said holding means in its engaged position.

6. A device of the character described comprising, a vehicle dash, a shelf formed on the forward face of said dash, a battery positioned on said shelf, a tongue and groove connection between said battery and shelf, one of the elements of said connection being fixed relative to said shelf with the other of said elements being formed on said battery, said tongue and groove connection permitting the battery to be removed from said shelf through a movement in one direction only, means associated with said dash which in its engaged position coacts with said battery to prevent movement thereof in said direction, and locking means mounted upon said dash and accessible only from the rear face of the dash for locking said holding means in its engaged position.

7. A device of the character described comprising, a vehicle dash, a shelf formed on the forward face of said dash, a battery supported upon said shelf, tongues extending vertically from each end of said shelf, said battery having vertically extending grooves in each end thereof which coact with said tongues and permit only the lowering and raising of the battery from said shelf, detachable holding means associated with said dash which in its engaged position coacts with said battery to prevent raising thereof from said shelf, and locking means mounted upon said dash in position accessible only from the rear face of the dash for locking said holding means in its engaged position.

8. A device of the character described comprising, a vehicle dash, a shelf formed on the forward face of said dash, a battery positioned on said shelf, a pair of vertical tongues extending inwardly from the respective ends of said shelf, said tongues projecting into vertically extending grooves in the respective ends of said battery, an arm reciprocally mounted for movement in a vertical direction upon said dash, said arm having a head extending over the top portion of said battery, which head in the lowermost position of said arm prevents the raising of said battery from the shelf, and means accessible only from the rear face of the dash for locking said arm to the dash in its lowermost position.

9. A device of the character described comprising, a vehicle dash having its intermediate vertical portion offset rearwardly, a forwardly opening three-sided battery retainer fixedly secured in a rectangular shaped opening in said dash, a battery positioned in said retainer, a pair of tongues projecting inwardly towards the battery, which tongues are fixed to the said battery retainer and extend in a vertical direction, said tongues entering vertically extending grooves in said battery, so that the battery may be removed from said shelf through movement only by raising the battery vertically, an arm reciprocally mounted for movement in a vertical direction in said dash, said arm having a head which extends over the upper portion of the battery and which coacts therewith in its lowermost position to prevent raising of the battery sufficiently to disengage said tongues from said grooves, and locking means accessible only from the rear face of the dash for locking said arm in the said lowermost position.

10. A device of the character described comprising, a vehicle dash having its intermediate vertical portion offset rearwardly, a forwardly opening three-sided battery retainer fixedly secured upon said dash over a rectangular shaped opening through said offset portion, a battery positioned in said retainer, a pair of tongues pressed in the sides of said retainer which project inwardly towards said battery, said tongues extending in a vertical direction, a pair of vertically extending grooves formed in the ends of said battery into which said tongues project, so that said battery may only be lowered in place in said retainer, an arm disposed on the forward side of said dash having a head thereon which projects laterally over the top of said battery, a stud extending from said arm through an opening in said dash which locks said arm in its lowermost position, to thereby prevent raising of the battery from said retainer.

11. A device of the character described comprising, a vehicle dash having its intermediate vertical portion offset rearwardly, a forwardly opening three-sided battery retainer fixedly secured in a rectangular shaped opening through said offset portion of the dash, the front face of said battery retainer being substantially vertically aligned with the lower portion of said dash and the rear face of said retainer being vertically aligned with the upper portion of said dash, a batttery positioned in said retainer, a frame positioned around the top of said battery having bolts extending from said frame downwardly through suitable openings in said offset portion, nuts accessible only from the rear of said offset portion for drawing said bolts into position and a holding means associated with said dash which in its engaged position extends over the top of said frame and prevents upward movement thereof independently of said bolts, and locking means mounted upon said dash accessible only from the rear face thereof for locking said holding means in its engaged position.

JOSEPH GALAMB.